United States Patent [19]

Tai

[11] Patent Number: 5,787,652
[45] Date of Patent: Aug. 4, 1998

[54] WINDOW INSULATING ASSEMBLY FOR VEHICLES

[76] Inventor: Liang-Ching Tai. No. 8. Min-Sheng Lane. Hsing-Shu Rd.. Chiao-Tou Hsiang. Kaohsiung County. Taiwan

[21] Appl. No.: 699,735

[22] Filed: Aug. 20, 1996

[51] Int. Cl.6 ...................................................... E06B 7/00
[52] U.S. Cl. ................................................ 52/171.3; 62/248
[58] Field of Search ................................. 52/171.3, 171.2,
52/172; 454/85, 93, 122, 125, 133, 200,
202, 205, 212, 213; 62/248

[56] References Cited

U.S. PATENT DOCUMENTS

| | | | |
|---|---|---|---|
| 3,307,373 | 3/1967 | Booth | 62/248 |
| 3,452,553 | 7/1969 | Dershin et al. | 62/248 X |
| 4,093,352 | 6/1978 | Pisar | 52/171.3 X |
| 4,380,994 | 4/1983 | Seemann | 52/171.3 X |
| 4,521,077 | 6/1985 | Connelly | 52/171.3 X |
| 4,768,315 | 9/1988 | Grimme | 52/171.3 X |
| 4,829,729 | 5/1989 | Derner et al. | 52/171.3 |
| 4,944,125 | 7/1990 | Ito . | |
| 5,119,608 | 6/1992 | Glover et al. . | |
| 5,197,242 | 3/1993 | Baughman et al. . | |
| 5,608,995 | 3/1997 | Borden . | |

FOREIGN PATENT DOCUMENTS 2555648  5/1985  France ................................. 52/171.3

*Primary Examiner*—Lanna Mai
*Attorney, Agent, or Firm*—Bacon & Thomas

[57] ABSTRACT

A window insulating assembly for vehicles includes a hollow window structure having a compartment defined therein. A separation wall is mounted in the compartment, thereby defining the compartment into an overflow chamber and an operative chamber which are intercommunicated with each other at tops thereof. A tank is provided for receiving an insulating liquid therein. The tank includes a first end communicated to the operative chamber via an inlet conduit and a second end communicated to the overflow chamber via an overflow conduit. An outlet conduit is communicated between the tank and the operative chamber for emptying the operative chamber. A pump is used to feed the insulating liquid into the operative chamber to form an insulating layer for preventing sunlight from passing through the window structure.

3 Claims, 1 Drawing Sheet

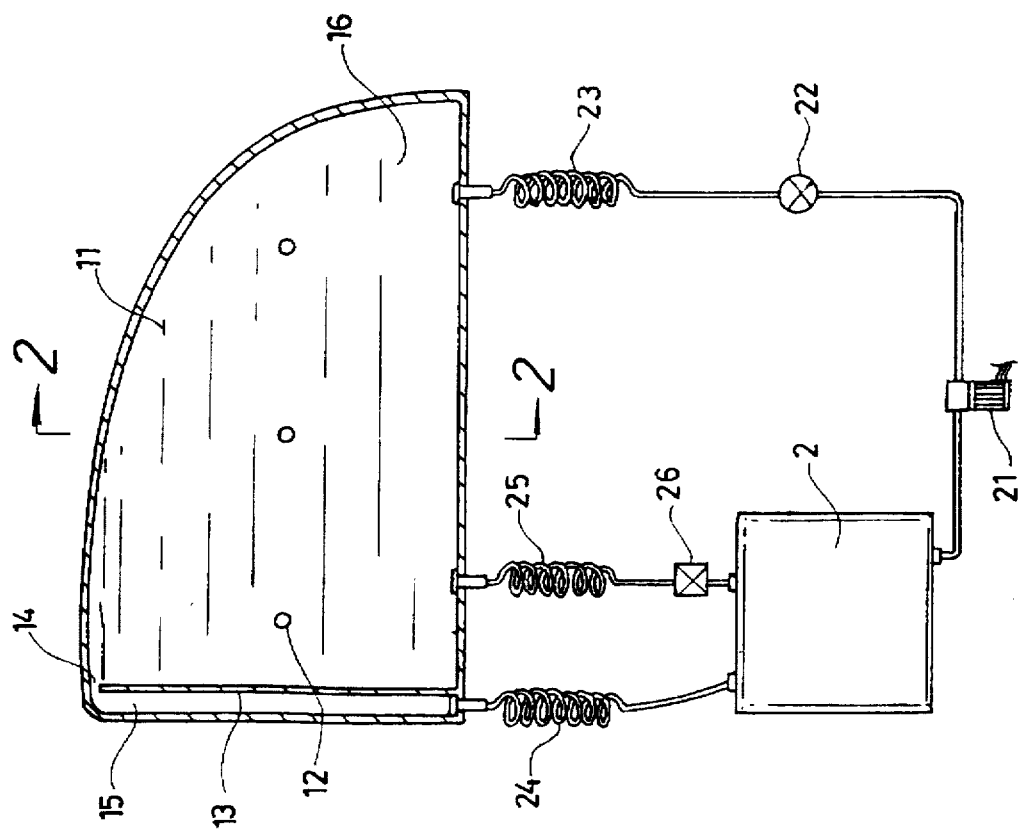

WINDOW INSULATING ASSEMBLY FOR VEHICLES

BACKGROUND OF THE INVENTION

1. Field of the Invention

The present invention relates to a window insulating assembly for vehicles, and more particularly to an insulating assembly which may prevent the temperature from rising significantly inside the vehicle without resulting in obstacles to the driver's view.

2. Description of the Related Art

Generally, the interior temperature of vehicles increases rapidly when exposed under sunlight, particularly on hot days. Many drivers use tinted glass or adhere tinted transparent films to the windows to reduce transmission of the sunlight. If the degree of tint of the glass or the transparent films are deep, the driver's view is adversely affected when at night. On the contrary, if the degree of tint of the glass or the transparent films are light, the filtering effect thereof is not satisfactory. The present invention is intended to provide a window insulating assembly which mitigates and/or obviates the above problems.

SUMMARY OF THE INVENTION

A window insulating assembly for vehicles in accordance with the present invention includes a hollow window structure having a compartment defined therein. A separation wall is mounted in the compartment, thereby defining the compartment into an overflow chamber and an operative chamber which are intercommunicated with each other at tops thereof. A tank is provided for receiving an insulating liquid therein. The tank includes a first end communicated to the operative chamber via an inlet conduit and a second end communicated to the overflow chamber via an overflow conduit. An outlet conduit is communicated between the tank and the operative chamber for emptying the operative chamber. A power means, such as a pump is used to feed the insulating liquid into the operative chamber to form an insulating layer for preventing sunlight from passing through the window structure.

In an embodiment of the present invention, the hollow window structure is consisted of two window pieces and further comprises a plurality of ribs interconnected between the two window pieces to reinforce the hollow window structure.

Preferably, a check valve is provided in the inlet conduit such that liquid is only flowable from the tank into the operative chamber.

Other objects, advantages, and novel features of the invention will become more apparent from the following detailed description when taken in conjunction with the accompanying drawings.

BRIEF DESCRIPTION OF THE DRAWINGS

FIG. 1 is a cross-sectional view illustrating a window insulating assembly for vehicles in accordance with the present invention; and FIG. 2 is a cross-sectional view taken along line 2—2 in FIG. 1.

DESCRIPTION OF THE PREFERRED EMBODIMENT

Referring to the FIGS. 1 and 2, a window insulating assembly in accordance with the present invention includes a hollow window structure 1 comprising a compartment 11 defined therein. The hollow window structure 1, such as a front windshield, rear windshield, or side window of a vehicle, may consist of two window pieces which are adhered together (see FIG. 2). A plurality of ribs 12 may be interconnected between the two window pieces to reinforce the window structure. As shown in FIG. 1, a separation wall 13 is mounted in the compartment 11, thereby defining the compartment 11 into an overflow chamber 15 and an operative chamber 16 which are intercommunicated with each other at tops thereof by a passage 14.

The window insulating assembly further includes a tank 2 for receiving an insulating liquid therein. A first end of the tank 2 is communicated to the operative chamber 16 via an inlet conduit 23, while a second end of the tank 2 is communicated to the overflow chamber 15 via an overflow conduit 24. A check valve 22 is provided in the inlet conduit 23 such that liquid is only flowable from the tank 2 into the operative chamber 16. A power device, such as a pump 21, is provided to the inlet conduit 23 for continuously feeding liquid into the operative chamber 16. In addition, an outlet conduit 25 is communicated between the tank 2 and the operative chamber 16 for emptying the operative chamber 16 under the control of a solenoid valve 26, when necessary.

When the vehicle is exposed to sunlight, the insulating liquid inside the tank 2 is pumped into the operative chamber 16 by the pump 21, thereby forming an insulating layer for "filtering" the sunlight, e.g., the insulating layer formed by the insulating liquid may reflect the sunlight. This arrangement allows the interior temperature of the vehicle to not rise significantly when exposed to sunlight. Excess liquid may return the tank 2 via the overflow chamber 15 and the overflow conduit 24. The height of the insulating layer may be adjusted according to actual need when in use. When at night, the insulating liquid may be conveyed to the tank 2 from the outlet conduit 25 under the control of the solenoid valve 26, such that no liquid remains inside the window structure 1 to obstacle the driver's view.

Although the invention has been explained in relation to its preferred embodiment, it is to be understood that many other possible modifications and variations can be made without departing from the spirit and scope of the invention as hereinafter claimed.

What is claimed is:

1. A window insulating assembly, comprising:

a hollow window structure comprising a compartment defined therein, a separation wall being mounted in the compartment, thereby defining the compartment into an overflow chamber and an operative chamber which are intercommunicated with each other at tops thereof;

a tank for receiving an insulating liquid therein, the tank comprising a first end communicated to the operative chamber via an inlet conduit and a second end communicated to the overflow chamber via an overflow conduit, an outlet conduit being communicated between the tank and the operative chamber for emptying the operative chamber; and means for feeding the insulating liquid into the operative chamber to form an insulating layer for preventing sunlight from passing through the window structure.

2. The window insulating assembly as claimed in claim 1, wherein the hollow window structure is consisted of two window pieces and further comprises a plurality of ribs interconnected between the two window pieces to reinforce the hollow window structure.

3. The window insulating assembly as claimed in claim 1, further comprising a check valve provided in the inlet conduit such that liquid is only flowable from the tank into the operative chamber.

\* \* \* \* \*